United States Patent
Klennert

(10) Patent No.: US 10,008,822 B2
(45) Date of Patent: Jun. 26, 2018

(54) LASER SYSTEM AND METHOD FOR CONTROLLING THE WAVE FRONT OF A LASER BEAM

(71) Applicant: The Boeing Company, Chicago, IL (US)

(72) Inventor: Wade Lawrence Klennert, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 312 days.

(21) Appl. No.: 14/511,865

(22) Filed: Oct. 10, 2014

(65) Prior Publication Data

US 2016/0104996 A1   Apr. 14, 2016

(51) Int. Cl.
  *G02B 26/00* (2006.01)
  *G02F 1/01* (2006.01)
  (Continued)

(52) U.S. Cl.
  CPC ............ *H01S 3/1305* (2013.01); *G02B 26/06* (2013.01); *H01S 3/0085* (2013.01);
  (Continued)

(58) Field of Classification Search
  CPC ................ G02B 27/48; G02B 27/0927; G02B 27/1046; G02B 27/1053; G02B 27/2235; G02B 3/0037; G02B 26/00; H04N 9/3161; H04N 5/7416; H04N 9/3132; H04N 9/3141; H04N 9/315; G03B 21/2033;
  (Continued)

(56) References Cited

U.S. PATENT DOCUMENTS 4,899,347 A * 2/1990 Kuchar .................. H01S 3/061
                                                                                372/33
5,090,795 A * 2/1992 O'Meara ................ G02B 26/06
                                                                            348/E9.027
(Continued)

OTHER PUBLICATIONS

Andrusyak, Oleksiy, et al.; "Beam Combining of Lasers with High Spectral Density Using Volume Bragg Gratings"; *Optics Communications*; 282 (2009); pp. 2560-2563.
(Continued)

*Primary Examiner* — Bumsuk Won
*Assistant Examiner* — Balram Parbadia
(74) *Attorney, Agent, or Firm* — Alston & Bird LLP

(57) ABSTRACT

A laser system and associated method are provided for controlling the wave front of a primary laser beam. The laser system includes a laser medium for producing a primary laser beam and at least one optical element to which the primary laser beam is directed. The laser system also includes a secondary laser source for producing a secondary laser beam. The laser system may further include a spatial light modulator configured to receive the secondary laser beam and to spatially modulate the secondary laser beam to create a spatially modulated secondary laser beam having a spatial intensity pattern. The spatially modulated secondary laser beam may impinge upon at least one of the laser medium or the at least one optical element in order to selectively modify the temperature of portions of the laser medium or the at least one optical element upon which the spatially modulated secondary laser beam impinges.

20 Claims, 5 Drawing Sheets

(51) Int. Cl.
*H01S 3/13* (2006.01)
*G02B 26/06* (2006.01)
*H01S 3/00* (2006.01)
*H01S 3/131* (2006.01)
*H01S 3/23* (2006.01)

(52) U.S. Cl.
CPC .............. *H01S 3/1317* (2013.01); *H01S 3/23* (2013.01); *H01S 3/1307* (2013.01)

(58) Field of Classification Search
CPC . G03B 21/14; H01S 3/08072; H01S 3/08077; G02F 1/01
See application file for complete search history.

(56) References Cited

U.S. PATENT DOCUMENTS

| | | | | |
|---|---|---|---|---|
| 5,193,096 A | * | 3/1993 | Amano | H01S 3/117 372/10 |
| 6,185,235 B1 | * | 2/2001 | Cheng | H01S 3/09415 372/39 |
| 6,219,360 B1 | | 4/2001 | Komine | |
| 6,625,381 B2 | * | 9/2003 | Roddy | G02B 6/42 348/E9.026 |
| 6,849,841 B2 | | 2/2005 | Byren et al. | |
| 7,382,534 B2 | * | 6/2008 | Shinbo | G03B 21/625 348/E5.141 |
| 8,029,141 B2 | * | 10/2011 | Mizushima | G02B 3/0037 348/752 |
| 8,109,638 B2 | * | 2/2012 | Chen | G02B 27/48 348/744 |
| 8,434,871 B2 | * | 5/2013 | Bartol | G02B 27/2235 353/7 |
| 9,010,965 B2 | * | 4/2015 | Sudarshanam | G02B 27/48 362/259 |
| 2002/0045104 A1 | * | 4/2002 | Efimov | G03H 1/02 430/2 |
| 2003/0039036 A1 | * | 2/2003 | Kruschwitz | G02B 27/0927 359/707 |
| 2005/0147135 A1 | * | 7/2005 | Kurtz | H01S 5/36 372/23 |
| 2006/0018025 A1 | * | 1/2006 | Sharon | H04N 9/3129 359/618 |
| 2008/0187019 A1 | * | 8/2008 | Chung | H01S 3/07 372/50.11 |
| 2010/0103088 A1 | * | 4/2010 | Yokoyama | G02F 1/3775 345/102 |
| 2010/0232007 A1 | * | 9/2010 | Byren | F41H 13/005 359/291 |
| 2011/0043900 A1 | * | 2/2011 | Bayramian | G02B 27/0944 359/349 |
| 2011/0043917 A1 | * | 2/2011 | Bayramian | G02B 27/0927 359/569 |
| 2011/0285963 A1 | * | 11/2011 | Kurtz | G02B 27/18 353/8 |
| 2013/0107360 A1 | * | 5/2013 | Kurtz | G02B 1/00 359/434 |

OTHER PUBLICATIONS

Bowman, S.R., et al.; "New Materials for Optical Cooling"; *Appl. Phys. B* 71, 807-811 (2000).
Ciapurin, Igor V., et al.; "Spectral Combining of High-Power Fiber Laser Beams Using Bragg Grating PTR Glass"; *Proceedings of SPIE*, vol. 5335; 2004; pp. 116-124.
Ciapurin, Igor V., et al.; Incoherent Combining of 100-W Yb-Fiber Laser Beams by PTR Bragg Grating; Advances in Fiber Devices; vol. 4974 (2003); pp. 209-219.
Drachenberg, D., et al.; "Thermal Tuning of Volume Bragg Gratings for Spectral Beam Combining of High-Power Fiber Lasers"; *Applied Optics*; vol. 53, No. 6; Feb. 20, 2014; pp. 1242-1246.
Edwards, Bradley C., et al.; "Demonstration of a Solid-State Optical Cooler: An Approach to Cryogenic Refrigeration"; *Journal of Applied Physics*; vol. 86, No. 11; pp. 6489-6493.
Hoyt, C.W., et al.; "Advances in Laser Cooling of Thulium-Doped Glass"; *J. Opt. Soc. Am. B*; vol. 20; No. 5; May 2003; pp. 1066-1074.
Hoyt, C.W., et al.; "Observation of Anti-Stokes Fluorescence Cooling in Thulium-Doped Glass"; *Physical Review Letters*; vol. 85, No. 17; Oct. 23, 2000; pp. 3600-3603.
Mendioroz, A., et al.; "Anti-Stokes Laser Cooling in $Yb^{3+}$-doped $KPb_2Cl_5$ Crystal"; *Optics Letters*; vol. 27, No. 17; Sep. 1, 2001; pp. 1525-1527.
Mungan, C.E., et al.; "Laser Cooling of a Solid by 16 K Starting from Room Temperature"; *Physical Review Letters*; vol. 78, No. 6; Feb. 10, 1997; pp. 1030-1033.
Mungan, C.E, et al.; "Internal Laser Cooling of $Yb^{3+}$-doped Measured Between 100 and 300 K"; *Appl. Phys. Lett.* 71 (11); Sep. 15, 1997; pp. 1458-1460.
Sevian, Armen, et al.; "Efficient Power Scaling of Laser Radiation by Spectral Beam Combining"; *Optics Letters*; vol. 33, No. 4; Feb. 15, 2008; pp. 384-386.
Stenholm, Stig; "The Semiclassical Theory of Laser Cooling"; *Reviews of Modern Physics*; vol. 58, No. 3; Jul. 1986; pp. 699-739.
Preliminary Search Report and Written Opinion from corresponding French Application No. 15 59382, dated Aug. 28, 2017, 9 pages.

* cited by examiner

LASER SYSTEM AND METHOD FOR CONTROLLING THE WAVE FRONT OF A LASER BEAM

TECHNOLOGICAL FIELD

An example embodiment relates generally to a laser system and associated method for controlling the wave front of a laser beam and, more particularly, to a laser system and associated method for introducing a secondary laser beam that serves to control the wave front of a primary laser beam.

BACKGROUND

Laser systems preferentially generate a wave front of a predefined shape such that resulting laser beam has a desired beam quality. In some instances, optical aberrations may be introduced into the wave front by the optical elements of a laser system including optical aberrations introduced by the laser medium, a laser amplifier or other optical components. The optical aberrations may be introduced by the structure and material composition of the optical elements and/or by thermal gradients in the optical elements that create optical path differences. For example, an optical element may be heated uniformly, but may have some portions that are heated to a greater degree than other portions by the laser, thereby creating a thermal gradient. As a result of the thermal gradient across the optical element, the optical element will introduce optical aberrations into the laser beam due to optical path differences occasioned by the thermal gradient. The optical aberrations will, in turn, reduce the efficiency and effectiveness of the laser system by introducing wave front errors and reducing the beam quality generated by the laser system.

In an effort to cancel or offset the optical aberrations, various complex optical systems have been developed. For example, heat transfer and/or cooling systems have been employed in conjunction with laser systems in an effort to reduce thermal gradients and, correspondingly, to reduce the resulting optical aberrations. For example, radially symmetric gain rods may be radially cooled in an effort to reduce thermal gradients. Additionally, fixed corrector plates or complex adaptive optical systems have been utilized in an effort to cancel the optical aberrations introduced by thermal gradients. Although the foregoing techniques may reduce the optical gradients, the resulting laser systems are more complex and, as a result, are generally more expensive.

One type of optical element that may experience a thermal gradient is a photo thermal refractive (PTR) glass optical element. A PTR glass optical element may be utilized, for example, to combine spectral beams in a laser system. The laser beam(s) propagating through a PTR optical element generally increases the temperature of the PTR optical element. As the temperature of the PTR glass optical element increases, the refractive index of the PTR glass optical element changes which, in turn, changes the wavelength of light that is output by the PTR glass optical element. For example, a PTR optical element may operate as a grating such that the increased temperature of the PTR optical element changes the refractive index of the PTR optical element which, in turn, changes the wavelength of the light emitted by the grating which may adversely effect the efficiency of the grating.

In an effort to reduce the temperature increase experienced by a PTR optical element, a PTR optical element may be heated or cooled from its outer edge with a thermal control system. This technique may introduce temperature gradients throughout the volume of the PTR optical element which may, in turn, cause different portions of the PTR optical element to perform differently than other portions of the PTR optical element based upon the thermal gradient, thereby also adversely impacting the overall efficiency of the PTR optical element. Additionally, the thermal systems utilized in an effort to control the temperature of a PTR optical element may be relatively bulky and, as a result, may be unable to be employed in a small laser cavity. For example, the thermal systems utilized in conjunction with a PTR optical element for purposes of thermal stabilization may include mounts that are required to house a relatively large thermoelectric cooler (TEC), relatively large cold plates requiring cooling water and corresponding electrical cords for supplying power. In certain applications of the laser system in which the laser system including the thermal control system must be placed in a vacuum chamber, the infrastructure to support the mounting of the thermal system may create challenges.

BRIEF SUMMARY

A laser system and associated method are provided in accordance with an example embodiment for controlling the wave front of a primary laser beam. In this regard, the laser system and method of an example embodiment may selectively cause portions of a laser medium or other optical element to thermally contract or expand in order to correspondingly alter the wave front of the primary laser beam. For example, the laser medium or other optical element may be selectively thermally contracted or expanded in order to offset optical aberrations otherwise introduced by the laser system such that the resulting wave front of the primary laser beam has a desired shape and beam quality. In an example embodiment, a PTR glass optical element may include a dopant responsive to a secondary laser beam such that exposure of the PTR glass optical element to the secondary laser beam may be utilized in order to modify the temperature of the doped PTR glass optical element, thereby improving the performance of the laser system including the PTR glass optical element.

In an example embodiment, a laser system is provided that includes a laser medium configured to produce a primary laser beam and at least one optical element configured to receive the primary laser beam. The laser system also includes a secondary laser source configured to produce a secondary laser beam. The laser system further includes a spatial light modulator configured to receive the secondary laser beam and to spatially modulate the secondary laser beam to create a spatially modulated secondary laser beam having a spatial intensity pattern. The laser system of this example embodiment is configured such that the spatially modulated secondary laser beam impinges upon at least one of the laser medium or the at least one optical element in order to cause respective portions of the laser medium or the at least one optical element upon which the spatially modulated secondary laser beam impinges to thermally contract or expand. As a result, the wave front of the primary laser beam is controllably altered.

The secondary laser beam may have a different wavelength than the primary laser beam. The at least one of the laser medium or the at least one optical element upon which the spatially modulated secondary laser beam impinges may include at least one dopant that is excited in response to the wavelength of the secondary laser beam. The laser system of an example embodiment may also include a wave front sensor configured to measure the wave front of the primary laser beam and a controller configured to control spatial modulation of the secondary laser beam provided by the spatial light modulator based upon the wave front of the primary laser beam as measured by the wave front sensor. The wave front sensor of an example embodiment is configured to repeatedly measure the wave front of the primary laser beam over time. In this embodiment, the controller is further configured to modify the spatial light modulator to modify the spatial intensity pattern of the secondary laser beam such that the secondary laser beam controllably regulates the thermal energy in a volume of the optical element, based upon changes in the wave front of the primary laser beam measured by the wave front sensor over time to thereby control thermal expansion and contraction in the optical element so as to minimize aberrations or optical path differences in the wave front of the primary laser beam. The spatially modulated secondary laser beam may co-propagate with the primary laser beam.

In another example embodiment, a method of controlling a wave front of a primary laser beam is provided that includes generating the primary laser beam with a laser medium. The method of this example embodiment directs the primary laser beam to at least one optical element. The method of this example embodiment also generates a secondary laser beam and spatially modulates the secondary laser beam to create a spatially modulated secondary laser beam having a spatial intensity pattern. In this example embodiment, the method also directs the spatially modulated secondary laser beam to impinge upon at least one of the laser medium or the at least one optical element in order to cause respective portions of at least one of the laser medium or the at least one optical element upon which the spatially modulated secondary laser beam impinges to thermally contract or expand. As such, the wave front of the primary laser beam is controllably altered.

The method of an example embodiment generates the secondary laser beam so as to have a different wavelength than the primary laser beam. In this example embodiment, the at least one of the laser medium or the at least one optical element upon which the spatially modulated secondary laser beam impinges includes at least one dopant that is excited in response to the wavelength of the secondary laser beam. The method of an example embodiment also includes measuring the wave front of the primary laser beam and controlling spatial modulation of the secondary laser beam based upon the wave front of the primary laser beam that has been measured. The method of this example embodiment may also include repeatedly measuring the wave front of the primary laser beam over time and modifying the spatial intensity pattern of the secondary laser beam such that the secondary laser beam controllably regulates the thermal energy in a volume of the optical element, based upon changes in the wave front of the primary laser beam measured over time to thereby control thermal expansion and contraction in the optical element so as to minimize aberrations or optical path differences in the wave front of the primary laser beam. In an example embodiment, the spatially modulated secondary laser beam co-propagates with the primary laser beam.

In a further example embodiment, a laser system is provided that includes a laser medium configured to produce a primary laser beam and a doped photo thermal refractive (PTR) glass optical element configured to receive the primary laser beam. The laser system of this example embodiment also includes a secondary laser source configured to produce a secondary laser beam having a different wavelength than the primary laser beam. The laser system is configured such that the secondary laser beam impinges upon the doped PTR glass optical element in order to modify the temperature of the doped PTR glass optical element.

The doped PTR glass optical element includes one or more dopants that include, but are not limited to, neodymium (Nd), thulium (Th) or ytterbium (Yb), that are excited by the secondary laser beam. The dopant of an example embodiment is uniform throughout the doped PTR glass optical element. In an example embodiment, the dopant preferentially absorbs light of the wavelength of the secondary laser beam relative to light of the wavelength of the primary laser beam. The laser medium may include a plurality of laser sources and the doped PTR glass optical element may be configured to combine the primary laser beams generated by the plurality of laser sources. The doped PTR glass optical element may function as an optical grating. The PTR glass optical element of an example embodiment includes a reflective coating configured to preferentially reflect light of the wavelength of the secondary laser beam relative to light of the wavelength of the primary laser beam.

BRIEF DESCRIPTION OF THE DRAWINGS

Figure 1:
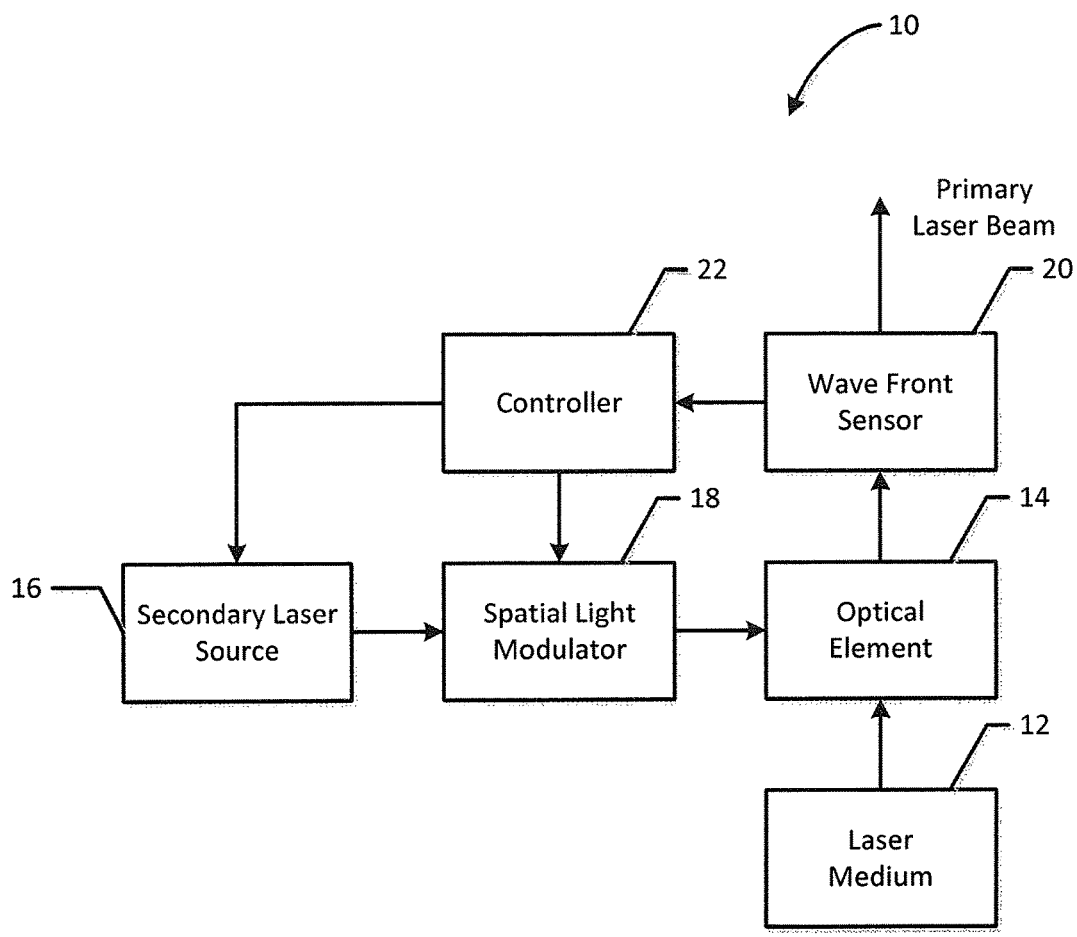
Figure 2:
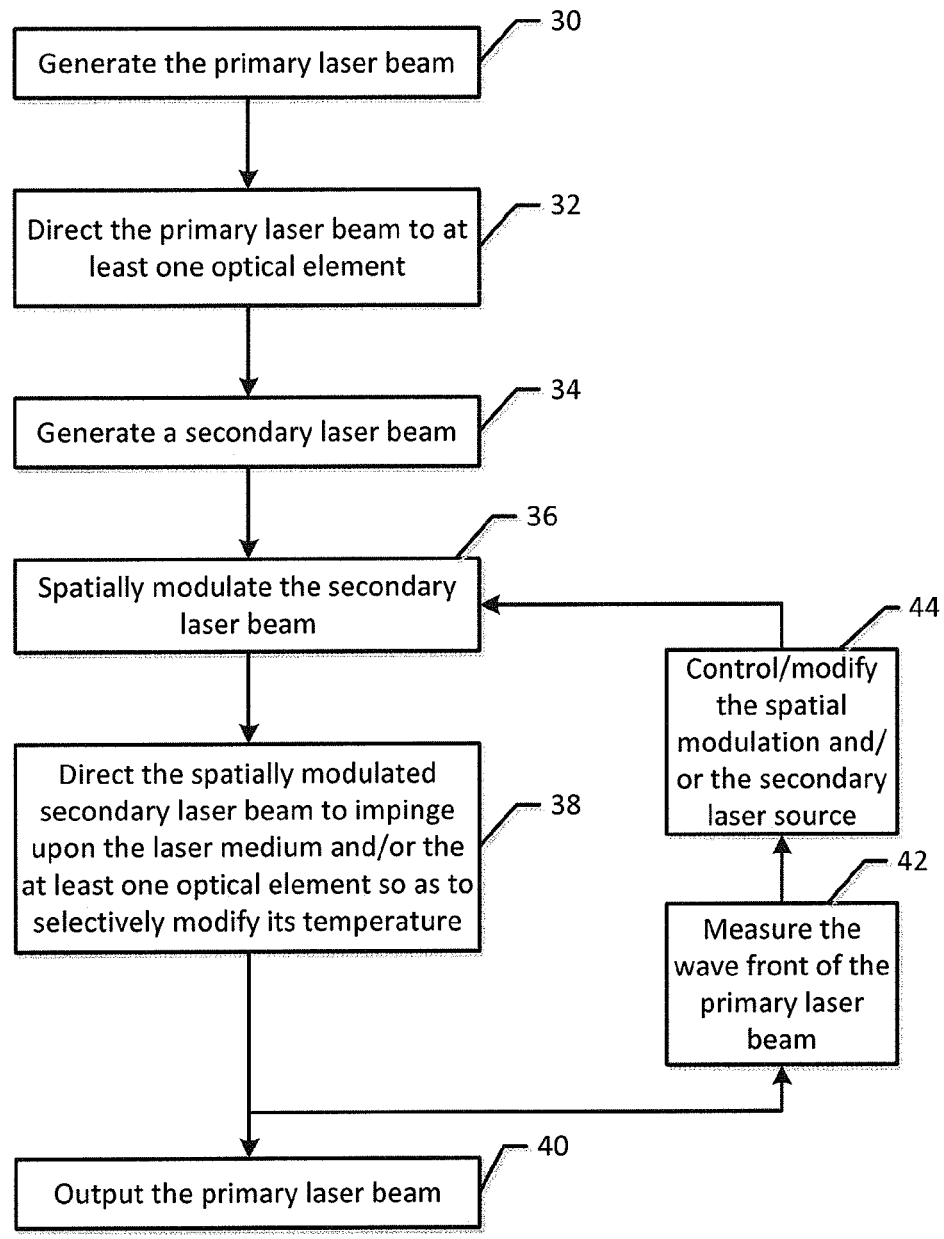
Figure 3:
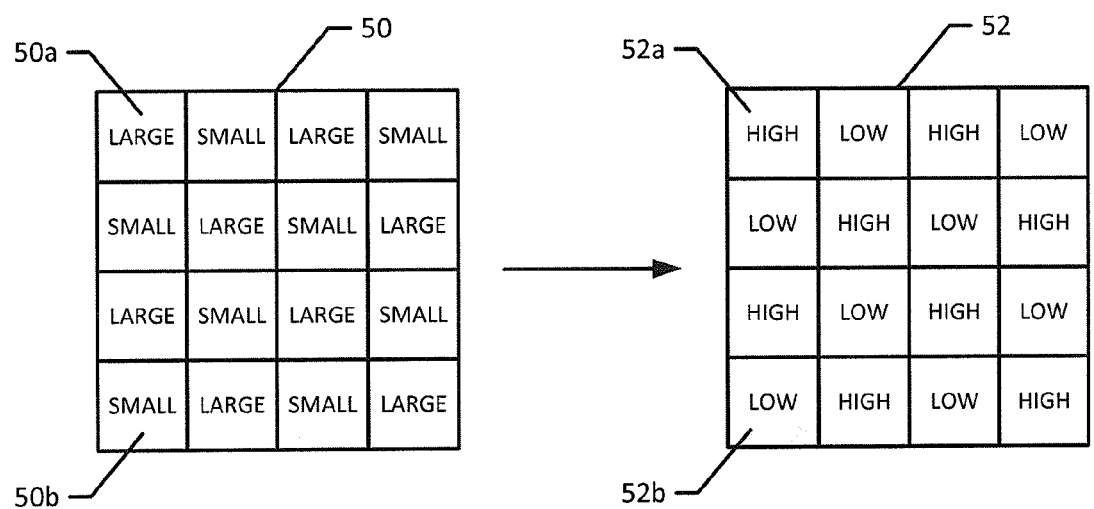
Figure 4:
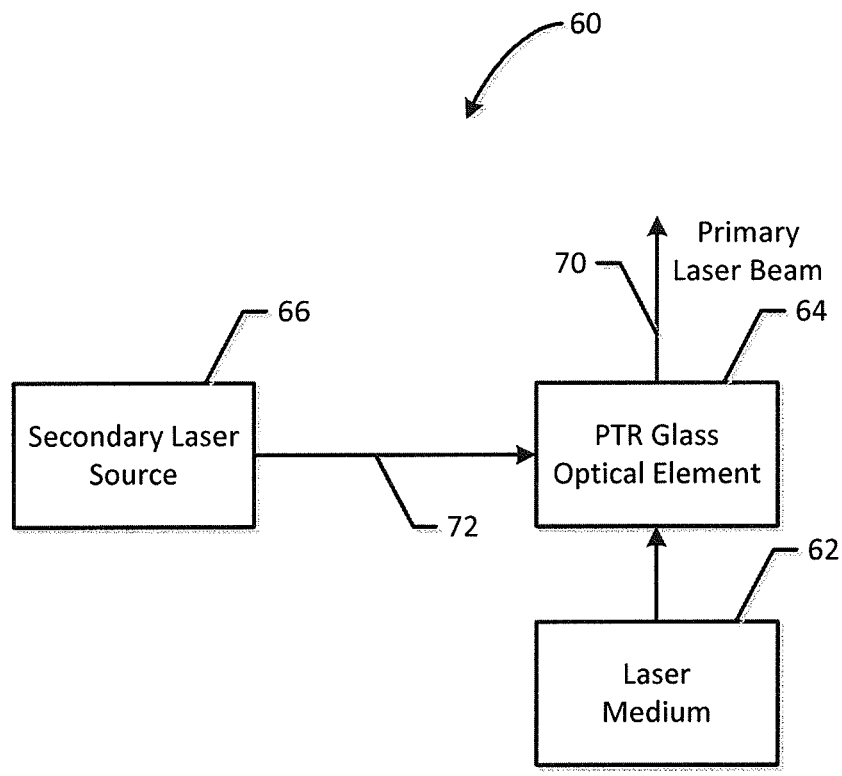
Figure 5:
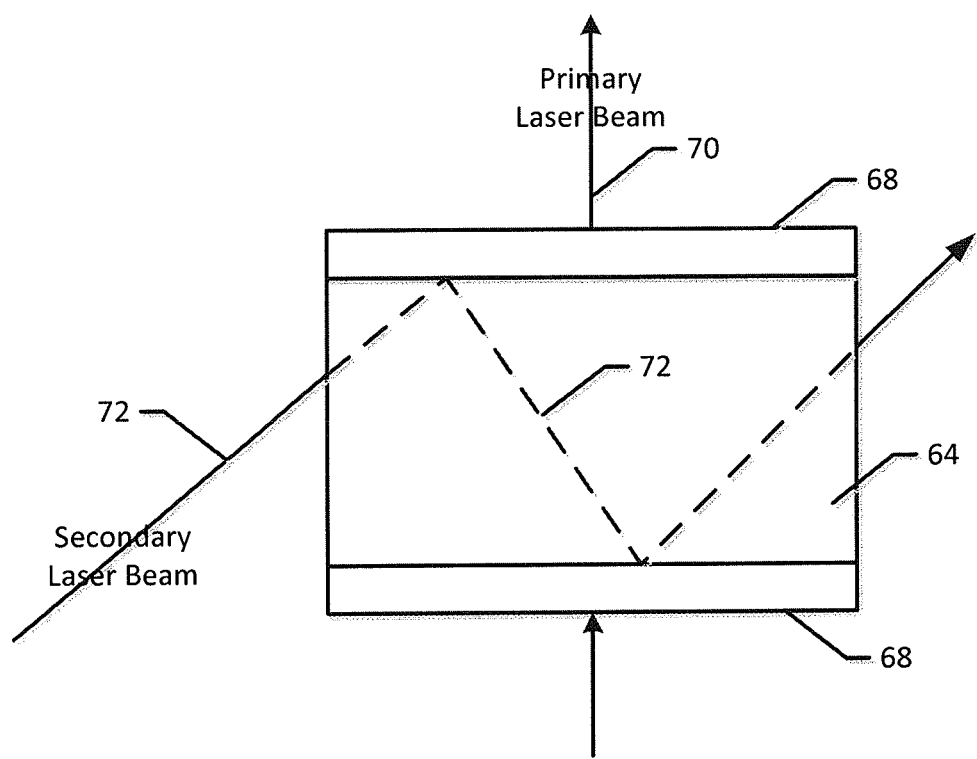

Having thus described aspects of the present disclosure in general terms, reference will now be made to the accompanying drawings, which are not necessarily drawn to scale, and wherein:

FIG. 1 is a block diagram of a laser system that includes a spatial light modulator to create a spatially modulated secondary laser beam to provide for selective thermal contraction or expansion of an optical element in order to alter the wave front of a primary laser beam in accordance with an example embodiment of the present disclosure;

FIG. 2 is a flowchart of the operations performed, such as by the laser system of FIG. 1, in accordance with an example embodiment of the present disclosure;

FIG. 3 is an illustration of the manner in which portions of an optical element may be selectively thermally expanded or contracted by a spatially modulated secondary laser beam based upon optical path differences in the laser system in accordance with an example embodiment of the present disclosure;

FIG. 4 is a block diagram of a laser system including a doped photo thermal refractive (PTR) glass optical element and a laser cooling system configured to modify the temperature of the doped PTR glass optical element in accordance with an example embodiment of the present disclosure; and FIG. 5 is a side view of a doped PTR glass optical element through which a secondary laser beam provided by a laser cooling system propagates in a zig-zag manner in accordance with an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A laser system 10 and method are provided in accordance with an example embodiment in order to control the thermal expansion or contraction of an optical element. For example, respective portions of a laser medium 12 or other optical element 14 may be caused to thermally contract or expand with a spatially modulated laser beam so as to correspondingly alter the wave front of a primary laser beam. As such, optical aberrations may be reduced, if not eliminated, such that the laser system generates a primary laser beam having a desired wave front and improved beam quality. The laser system and method of another example embodiment may modify the temperature of a doped photo thermal refractive (PTR) glass optical element with a secondary laser beam, such as to stabilize the temperature in order to reduce, if not eliminate, thermal gradients in the PTR glass optical element such that the performance of the PTR glass optical element is enhanced.

A laser system 10 in accordance with an example embodiment is depicted in FIG. 1. The laser system includes a laser medium 12 configured to produce a primary laser beam, as shown in block 30 of FIG. 2. The laser medium may be embodied in various manners including by one or more solid state lasers, one or more semiconductor or diode lasers or the like. The laser system may also include one or more optical elements, depicted generally as optical element 14. The optical element may include a laser amplifier, one or more lenses, one or more mirrors or other optical components. The primary laser beam is directed from the laser medium to the optical element and the primary laser beam may then propagate through or be reflected or otherwise redirected by the optical element. See block 32 of FIG. 2.

Different portions of the primary laser beam may be subjected to optical path differences during their propagation through the laser system 10. While the optical path differences may be introduced during the manufacture of the laser medium 12 and/or the one or more optical elements 14, optical path differences may also be introduced by thermal gradients across the laser medium and/or the one or more optical elements. Although various types of laser beams may be utilized including flat top and annular laser beams, in an instance of a Gaussian laser beam in which the intensity is greater at the center of the laser beam, optical elements may become hotter where the center of the laser beam impinges an optical element, which creates a temperature gradient in the optical element. The temperature gradient in the optical element may cause an initially generated laser beam, in which photons are in phase, to become out of phase or to have optical path differences. As a result of the optical path differences experienced by different portions of the primary laser beam, the wave front of the primary laser beam may differ in phase, shape, etc. from the desired wave front, thereby reducing the resulting beam quality of the primary laser beam.

In order to address the optical path differences and the deleterious impact upon the wave front and the beam quality, the laser system 10 may also include a secondary laser source 16 configured to produce a secondary laser beam, such as shown in block 34 of FIG. 2. The secondary laser source may be embodied in various manners including by one or more solid state lasers, one or more semiconductor or diode lasers or the like. While the laser medium 12 and the secondary laser source 16 may be embodied by the same type of laser, the laser medium and the secondary laser source may be embodied by different types of lasers in some embodiments.

As shown in FIG. 1, the laser system 10 of an example embodiment also includes a spatial light modulator 18. The spatial light modulator is configured to receive the secondary laser beam and to spatially modulate the secondary laser beam to create a spatially modulated secondary laser beam have a spatial intensity pattern, as shown in block 36 of FIG. 2. By spatially modulating the secondary laser beam, different portions of the secondary laser beam may have correspondingly different intensities. For example, some portions of the secondary laser beam may have a greater intensity than other portions of the secondary laser beam, which have a lesser intensity. The secondary laser beam may be spatially modulated or distorted, by using a deformable mirror for example, to alter the intensity pattern of the secondary laser beam, such that the secondary laser beam can controllably regulate the local intensity of thermal energy across the volume in which the laser beam impinges an optical element to thereby control the thermal expansion and contraction of the optical element. Accordingly, by spatially modulating or distorting the spatial intensity pattern of the secondary laser beam to regulate the thermal energy in the optical element volume impinged by the laser beam or outside of the volume impinged by the laser beam, thermal expansion and contraction in the optical element is controlled so as to alter the output of the wave front of the primary laser beam based on the measured wave front, to thereby correct, e.g., minimize, wave front aberrations or optical path differences caused by thermal gradients in the optic elements. As described below, the spatial modulation may be performed such that the impingement of the secondary laser beam upon the laser medium 12 or other optical element 14 alters the wave front of the primary laser beam so as to at least partially offset optical aberrations within the laser system. The spatial light modulator may be embodied in various manners including, for example, as a transmissive or reflective optical element, such as a deformable mirror, to spatially shape the intensity profile of the secondary laser beam.

The secondary laser source 16 and the spatial light modulator 18 may be disposed with the laser cavity. Alternatively, the secondary laser source and the spatial light modulator may be an extra-cavity system configured to provide for controlled thermal contraction or expansion of optical elements within or outside of the laser cavity. In an embodiment in which the spatial light modulator is embodied as a deformable mirror and in which secondary laser source and the spatial light modulator are an extra-cavity system, the laser cavity need not include the deformable mirror, thereby reducing the expense and complexity of the laser system 10, such as by eliminating a beam expander system that may otherwise be required if the deformable mirror were disposed within the laser cavity.

As shown in block 38, the spatially modulated secondary laser beam is directed so as to impinge upon the laser medium 12 and/or at least one optical element 14 so as to cause respective portions of the laser medium and/or the optical element upon which the spatially modulated secondary laser beam impinges to thermal expand or contract. The spatially modulated secondary laser beam impinges upon an optical element in the laser system of FIG. 1. Alternatively, the spatially modulated secondary laser beam may impinge upon the laser medium, in addition to or instead of impinging upon another optical element. The laser medium or other optical element upon which the spatially modulated secondary laser beam impinges includes dopant that is excited by light of the wavelength of the secondary laser beam. Although the wavelengths of the primary and secondary laser beams may be the same, the secondary laser beam of an example embodiment has a different wavelength than the wavelength of the primary laser beam with the wavelength of the secondary laser beam being defined in concert with the dopant such that the dopant is excited by light having the wavelength of the secondary laser beam, but is not excited by light having the wavelength of the primary laser beam. In this regard, the dopant is selected such that the laser medium and/or the optical element(s) that includes the dopant absorbs at least a portion of the energy of the secondary laser beam and emits the energy in the form of light of a different, e.g., higher, wavelength. For example, the dopant may be Ytterbium (Yb) in an instance in which the optical element is formed of $KPb_2Cl_5$ and the secondary laser beam has a wavelength of 986 nm. As another example, Yb may serve as the dopant in an instance in which the optical element is formed of yttrium aluminum garnet (YAG) and the secondary laser beam has a wavelength of 1 µm.

As a result of the spatial modulation of the secondary laser beam, different portions of the secondary laser beam have different intensities. Thus, the spatially modulated secondary laser beam causes the various portions of the laser medium 12 or other optical element 14 upon which the spatially modulated secondary laser beam impinges to be differently thermally contracted or expanded. In the illustrated embodiment in which the spatially modulated secondary laser beam impinges upon an optical element so as to cause thermal contraction, those portions of the optical element that are irradiated by the portions of the spatially modulated secondary laser beam having a greater intensity are caused to thermally contract more than those portions of the optical element that are irradiated by other portions of the spatially modulated secondary laser beam that have a lesser intensity. The differential thermal contraction or expansion of the optical element in response to the spatially modulated secondary laser beam correspondingly differently modifies the optical path difference through the optical element with those portions of the optical element that are thermally contracted to a greater degree having a reduced optical path relative to other portions of the optical element that are thermally contracted to a lesser degree (or are thermally expanded) by the spatially modulated secondary laser beam.

The optical path difference created by the optical element 14 in response to the impingement of the spatially modulated secondary laser beam alters the wave front of the primary laser beam. By taking into account the aberrations otherwise introduced by the laser system 10 in the absence of the secondary laser beam to the propagation of the primary laser beam therethrough, optical path differences may be introduced into an optical element by the spatially modulated secondary laser beam so as to at least partially, if not completely, offset the optical aberrations, thereby improving the wave front and the beam quality of the primary laser beam.

By way of example, grid 50 of FIG. 3 depicts the relative optical path difference experienced by different portions of the primary laser beam during its propagation through the laser system 10 in the absence of the secondary laser beam. As shown, a number of portions of the primary laser beam experience larger optical path differences than other portions of the primary laser beam that experience smaller optical path differences. For example, the upper left portion 50a of the wave front of the primary laser beam is subjected to a larger optical path difference, while the lower left portion 50b of the wave front of the primary laser beam is subjected to a smaller optical path difference. As noted above, these optical path differences may be due to a variety of factors including the manufacture of the laser medium 12 and the optical elements 14, thermal gradients within the optical elements, etc.

In order to alter the wave front of the primary laser beam in a manner that offsets the aberrations otherwise introduced by the optical path differences within the laser system 10, the secondary laser beam may be spatially modulated such that those portions of the optical element 14 through which the portions of the primary laser beam that experience larger optical path differences propagate are subjected to a secondary laser beam of greater intensity which, in turn, serves to cause the respective portions of the optical element to thermally contract when the laser beam is utilized to cool the optical element, thereby reducing the length of the optical path through the optical element experienced by the respective portions of the primary laser beam. See, for example, the grid 52 of FIG. 3 which defines the different portions of the spatially modulated secondary laser beam to have either a high intensity or a low intensity. As shown, the portions of the spatially modulated secondary laser beam that have a high intensity, such as the upper left portion 52a, positionally correspond to the portions of the primary laser beam that have experienced the larger optical path differences, such as the upper left portion 50a of grid 50.

Continuing with the foregoing example, the secondary laser beam may also be spatially modulated such that those portions of the optical element 14 through which the portions of the primary laser beam that experience smaller optical path differences propagate are subjected to a secondary laser beam of lesser intensity which, in turn, serves to cause the respective portions of the optical element to thermally contract so as reduce the length of the optical path through the optical element experienced by the respective portions of the primary laser beam, albeit by a substantially smaller amount than the reduction in the length of the optical path created by the greater intensity portions of the secondary laser beam. See, for example, the lower left portion 52b of the grid 52 of FIG. 3 which illustrates that the respective portion of the spatially modulated secondary laser beam has a low intensity. As shown, the portions of the spatially modulated secondary laser beam that have a low intensity, such as the lower left portion 52b, positionally correspond to the portions of the primary laser beam that have experienced the smaller optical path differences, such as the lower left portion 50b of grid 50. As such, the spatially modulated secondary laser beam effectively alters the optical path through different portions of the respective optical element in a manner that offsets, either partially or entirely, the optical path differences otherwise experienced by the primary laser beam within the laser system 10. The resulting primary laser beam may then be output as shown in block 40 of FIG. 2.

The spatially modulated secondary laser beam is described in the foregoing example to cause respective portions of the optical element 14 to thermally contract. Alternatively, the spatially modulated secondary laser beam may be configured, such as a result of utilizing a different wavelength, to cause respective portions of the optical element to thermally expand. In this alternative embodiment, the thermal expansion of the respective portions of the optical element may be controlled so as to offset the optical path differences otherwise experienced by the primary laser beam within the laser system 10.

By way of example, astigmatism is an optical operation defined by Zernike polynomials of $m=-1$ and $n=2$. As a result of the astigmatism, the wave front of the primary laser beam may have a potato chip profile in the absence of the secondary laser source 16. By controllably introducing thermal contract of an optical element 14 in a manner that offsets the astigmatism by modifying the optical path differences in the inverse of the potato chip profile, the resulting primary laser beam have an improved beam quality with a flatter wave front.

The laser system 10 may be operated in a static mode in which the secondary laser beam is spatially modulated in a predefined, fixed manner. In this embodiment, the spatial light modulator 18 may be embodied by a corrector plate having a fixed design. Alternatively, the laser system may be operated in a time-dependent manner in which the secondary laser beam is spatially modulated in a predefined manner that varies over time. For example, the secondary laser beam may be spatially modulated in a time-dependent manner with the spatial modulation varying in a predetermined manner following the startup of the laser system until the laser system has reached steady state operation, at which point in time the spatial modulation of the secondary laser beam may be fixed.

Still further, the laser system 10 may be operated in an adaptive manner. In this example embodiment, the laser system may include a wave front sensor 20 configured to measure the wave front of the primary laser beam. The laser system of this example embodiment also includes a controller 22, such as a computer, a processor or the like, that is responsive to the wave front sensor and, more particularly, to the wave front of the primary laser beam measured by the wave front sensor. The controller is configured to control the spatial modulation of the secondary laser beam provided by the spatial light modulator 18 based upon the wave front of the primary laser beam as measured by the wave front sensor. Thus, the controller is configured to determine from the wave front of the primary laser beam that has been measured by the wave front sensor those portions of the wave front that have experienced greater optical path differences than other portions of the wave front. The controller of this embodiment then correspondingly controls the spatial light modulator to modulate the secondary laser beam in order to create a spatially modulated secondary laser beam having a spatial intensity pattern configured to offset the optical path differences in the wave front of the primary laser beam. As shown in FIG. 1, the controller may also be in communication with the secondary laser source 16 so as to control operation of the secondary laser source such as by controlling the wavelength and/or power of the secondary laser beam, controlling whether the secondary laser beam is a continuous wave or is pulsed, etc.

In an example embodiment, the wave front sensor 20 is configured to repeatedly measure the wave front of the primary laser beam over time, such as at predetermined frequency. In this example embodiment, the controller 22 is also configured to modify the spatial modulation of the secondary laser beam provided by the spatial light modulator 18 based upon changes in the wave front of the primary laser beam as measured by the wave front sensor over time. Thus, the laser system 10 may accommodate changes in the optical aberrations introduced by the optical components of the laser system and may differently spatially modulate the secondary laser beam so as to offset the optical aberrations, even as the optical aberrations change.

The spatially modulated secondary laser beam may be configured to impinge upon the laser medium 12 or other optical element 14 in various manners. In an example embodiment, the spatially modulated secondary laser beam co-propagates with the primary laser beam through one or more optical components of the laser system 10. In this regard, the spatially modulated secondary laser beam propagates through a variety of components of the laser system with the spatially modulated secondary laser beam only affecting the optical element that has been doped with a dopant that is excited by light having the wavelength of the secondary laser beam. Instead of co-propagating with the primary laser beam through a number of optical components of the laser system, the spatially modulated secondary laser beam may be injected into a single component, such as a mirror, a lens or the like, having a coating that is reflective for light having the wavelength of the secondary laser beam, but not for light having the wavelength of the primary laser beam. Instead, the reflective coating of the optical component may be transparent to light having the wavelength of the primary laser beam. As such, the spatially modulated secondary laser beam may be injected into the optical component and then reflected out of the laser system 10 by the reflective surface so as to only propagate through the respective optical component without propagating through other optical components of the laser system.

As described, the laser system and method of an example embodiment causes respective portions of a laser medium 12 or other optical element 14 to thermally contract or expand in order to correspondingly alter the wave front of the primary laser beam. For example, respective portions of the laser medium or other optical element may be caused to thermally expand or contract in order to introduce optical path differences that offset optical aberrations otherwise introduced by the laser system 10 such that the resulting wave front of the primary laser beam has a desired shape and beam quality, such as by removing both axi- and nonaxi-symmetric wave front errors. In addition to offsetting optical aberrations and correspondingly improving the wave front and beam quality of the primary laser beam, the laser system may also or alternatively be configured to remove bulk heat from the system or add bulk heat to the system.

Although the above-described embodiment includes a single secondary laser source 16, the laser system 10 of other embodiments may include two or more secondary laser sources for generating two or more secondary laser beams having the same or different wavelengths. For example, the two or more secondary laser sources may be configured to cause different portions of the laser medium 12 or other optical element 14 to thermally contract or expand. By way of example, but not of limitation, one of the secondary laser sources may be configured to cause the edge portions of the optical element to thermally expand and another secondary laser source may be configured to cause the central portion of the optical element to thermally contract. Additionally or alternatively, the laser system may include two or more laser mediums for generating two or more primary laser beams having the same or different wavelengths. The laser system of an example embodiment may also include two or more controllers 22 and/or two or more spatial light modulators 18.

Another example embodiment is depicted in FIG. 4. In addition to the laser medium 62 as described above, the laser system 60 of this example embodiment includes an optical element 64 in the form of a doped PTR glass optical element. The PTR glass optical element is configured to receive the primary laser beam from the laser medium, either directly or following propagation through one or more other optical components. The PTR glass optical element may serve various purposes. For example, in an embodiment in which the laser medium includes a plurality of laser sources, the PTR glass optical element may be configured to combine the primary laser beams from the laser sources into a single primary laser beam. In this regard, the PTR glass optical element may serve as an optical grating.

In order to modify the temperature of the PTR glass optical element 64, the laser system 60 of this embodiment may also include a secondary laser source 66, such as a diode laser, configured to produce a secondary laser beam. Although the primary and secondary laser beams may have the same wavelength, the secondary laser beam of an example embodiment has a different wavelength than the wavelength of the primary laser beam. As such, the wavelengths of the primary and secondary laser beams are separated from one another in this example embodiment. The laser system of this example embodiment is configured such that the secondary laser beam impinges upon the PTR glass optical element. As a result of the doping of the PTR glass optical element with one or more dopants that are excited by the secondary laser beam, that is, by light having a wavelength of the secondary laser beam, the temperature of the doped PTR glass optical element may be modified, such as by being stabilized. The dopant with which the PTR glass optical element is doped is not only excited by the secondary laser beam, but preferentially absorbs light of the wavelength of the secondary laser beam relative to light of the wavelength of the primary laser beam. While the PTR glass optical element may include various types of dopants depending upon the relative wavelengths of the primary and secondary laser beams, the PTR glass optical element of an example embodiment may include, but is not limited to a neodymium (Nd) dopant, a thulium (Th) dopant or a ytterbium (Yb) dopant.

The PTR glass optical element 64 may be uniformly doped with the dopant. In one embodiment in which the PTR glass optical element is irradiated by the secondary laser beam from one side such that the secondary laser beam propagates through the PTR glass optical element in a manner such that the energy of the secondary laser beam gradually dissipates throughout the PTR glass optical element, that dopant profile within the PTR glass optical element may be configured to not be uniform, but to have a profile that varies in a manner to offset the differences in the energy of the secondary laser beam. For example, the PTR glass optical element of this example embodiment may include a lower percentage of dopant in those portions that experience a secondary laser beam of greater energy and a greater percentage of dopant in those portions that experience a secondary laser beam having lower energy.

In response to the impingement of the secondary laser beam, the PTR glass optical element 64 may be relatively uniformly heated or cooled by the excitation of the dopant by light having the wavelength of the secondary laser beam. Any additional heating or cooling of the PTR glass optical element that is created by the propagation of the primary laser beam therethrough may be of a relatively small scale compared to the heating introduced by the secondary laser beam. Thus, the primary laser beam will not create a thermal gradient, at least not nearly to the same degree, as may have been created within a PTR glass optical element in the absence of the thermal stabilization by the secondary laser beam. In an example embodiment, the secondary laser beam may be utilized to preheat the PTR glass optical element prior to introduction of the primary laser beam. Once the primary laser beam is introduced, the intensity of the secondary laser beam may be reduced and/or the secondary laser beam may be discontinued. However, as a result of the preheating, the performance of the PTR glass optical element may not change or at least not change as much following the introduction of the primary laser beam.

The secondary laser beam may impinge upon the PTR glass optical element 64 in various manners. In an example embodiment, the secondary laser beam impinges upon the PTR glass optical element in a relatively uniform manner such that all portions of the PTR glass optical element are uniformly irradiated. For example, one or more surfaces of the PTR glass optical element may be coated with a reflective surface 68 as shown in FIG. 5. In this regard, the reflective surface is tailored so as to be reflective for light having the wavelength of the secondary laser beam, but to be transparent to light having the wavelength of the primary laser beam. As such, the secondary laser beam may be introduced into the PTR glass optical element of this example embodiment at an angle such that a zig-zag pattern of the secondary laser beam is established within the PTR glass optical element, thereby more uniformly exciting the dopant within the PTR glass optical element.

A laser system 60 including a PTR glass optical element 64 and an associated method are therefore provided so as to improve the wave front of a primary laser beam by reducing or eliminating optical aberrations otherwise introduced by a thermal gradient in the PTR glass optical element. As described above, a PTR glass optical element may include a dopant responsive to a secondary laser beam such that exposure of the PTR glass optical element to the secondary laser beam serves to modify the temperature of the doped PTR glass optical element, such as by stabilizing the temperature of the doped PTR glass optical element, thereby improving the performance of the laser system including the PTR glass optical element.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A laser system comprising:
   a laser medium configured to produce a primary laser beam;
   at least one optical element configured to receive the primary laser beam;
   a secondary laser source, different than the laser medium, configured to produce a secondary laser beam; and
   a spatial light modulator configured to receive the secondary laser beam and to spatially modulate the secondary laser beam to create a spatially modulated secondary laser beam having a spatial intensity pattern with different intensities,
   wherein the laser system is configured such that the spatially modulated secondary laser beam having a different wavelength than a wavelength of the primary laser beam impinges upon at least one of the laser medium or the at least one optical element, wherein at least one of the laser medium or the at least one optical element upon which the spatially modulated secondary laser beam impinges comprises at least one dopant that is excited in response to the wavelength of the secondary laser beam but not in response to the wavelength of the primary laser beam such that impingement of the spatially modulated secondary laser beam causes respective portions of the at least one of the laser medium or the at least one optical element to thermally contract or expand, thereby controllably altering the wave front of the primary laser beam.

2. A laser system according to claim 1 wherein the secondary laser beam has a different wavelength than the primary laser beam.

3. A laser system according to claim 1 wherein the at least one dopant is configured to absorb energy of the secondary laser beam that impinges thereupon and to emit light having a different wavelength.

4. A laser system according to claim 1 further comprising:
a wave front sensor configured to measure the wave front of the primary laser beam; and
a controller configured to control spatial modulation of the secondary laser beam provided by the spatial light modulator based upon the wave front of the primary laser beam measured by the wave front sensor.

5. A laser system according to claim 4 wherein the wave front sensor is configured to repeatedly measure the wave front of the primary laser beam over time, and wherein the controller is further configured to control the spatial light modulator to modify the spatial intensity pattern of the secondary laser beam such that the secondary laser beam controllably regulates thermal energy in a volume of the optical element, based upon changes in the wave front of the primary laser beam measured by the wave front sensor over time to thereby control thermal expansion and contraction in the optical element so as to minimize aberrations or optical path differences in the wave front of the primary laser beam.

6. A laser system according to claim 1 further comprising:
a wave front sensor configured to measure the wave front of the primary laser beam; and
a controller configured to control operation of the secondary laser source based upon the wave front of the primary laser beam that has been measured.

7. A method of controlling a wave front of a primary laser beam, the method comprising:
generating the primary laser beam with a laser medium;
directing the primary laser beam to at least one optical element;
generating a secondary laser beam with a secondary laser source, different than the laser medium;
spatially modulating the secondary laser beam to create a spatially modulated secondary laser beam having a spatial intensity pattern with different intensities; and
directing the spatially modulated secondary laser beam having a different wavelength than a wavelength of the primary laser beam to impinge upon at least one of the laser medium or the at least one optical element, wherein at least one of the laser medium or the at least one optical element upon which the spatially modulated secondary laser beam impinges comprises at least one dopant that is excited in response to the wavelength of the secondary laser beam but not in response to the wavelength of the primary laser beam such that impingement of the spatially modulated secondary laser beam causes respective portions of at least one of the laser medium or the at least one optical element to thermally contract or expand, thereby controllably altering the wave front of the primary laser beam.

8. A method according to claim 7 wherein generating the secondary laser beam comprises generating the secondary laser beam having a different wavelength than the primary laser beam.

9. A method according to claim 7 wherein the at least one dopant is configured to absorb energy of the secondary laser beam that impinges thereupon and to emit light having a different wavelength.

10. A method according to claim 7 further comprising:
measuring the wave front of the primary laser beam; and
controlling spatial modulation of the secondary laser beam based upon the wave front of the primary laser beam that has been measured.

11. A method according to claim 10 further comprising:
repeatedly measuring the wave front of the primary laser beam over time, and
modifying the spatial intensity pattern of the secondary laser beam such that the secondary laser beam controllably regulates thermal energy in a volume of the optical element, based upon changes in the wave front of the primary laser beam measured over time to thereby control thermal expansion and contraction in the optical element so as to minimize aberrations or optical path differences in the wave front of the primary laser beam.

12. A method according to claim 7 further comprising:
measuring the wave front of the primary laser beam; and
controlling operation of the secondary laser source based upon the wave front of the primary laser beam that has been measured.

13. A laser system comprising:
a laser medium configured to produce a primary laser beam;
a doped photo thermal refractive (PTR) glass optical element configured to receive the primary laser beam; and
a secondary laser source, different than the laser medium, configured to produce a secondary laser beam having a different wavelength than the primary laser beam,
wherein the laser system is configured such that the secondary laser beam impinges upon the doped PTR glass optical element in order to modify a temperature of the doped PTR glass optical element, wherein at least one of the laser medium or the doped PTR glass optical element upon which the secondary laser beam impinges comprises at least one dopant that is excited in response to the wavelength of the secondary laser beam but not in response to the wavelength of the primary laser beam.

14. A laser system according to claim 13 wherein the at least one dopant is configured to absorb energy of the secondary laser beam that impinges thereupon and to emit light having a different wavelength.

15. A laser system according to claim 13 wherein the dopant is uniform throughout the doped PTR glass optical element.

16. A laser system according to claim 13 wherein the dopant comprises neodymium (Nd), thulium (Th) or ytterbium (Yb).

17. A laser system according to claim 13 wherein the laser medium comprises a plurality of laser sources, and wherein the doped PTR glass optical element is configured to combine the primary laser beams generated by the plurality of laser sources.

18. A laser system according to claim 13 wherein the doped PTR glass optical element comprises a PTR optical grating.

19. A laser system according to claim 13 wherein the PTR glass optical element comprises a reflective coating configured to preferentially reflect light of the wavelength of the secondary laser beam relative to light of the wavelength of the primary laser beam.

20. A laser system according to claim 13 wherein the optical element comprises a different component than the laser medium and includes the dopant that is excited in response to the wavelength of the secondary laser beam but not in response to the wavelength of the primary laser beam.

* * * * *